United States Patent [19]

West

[11] Patent Number: 4,657,232

[45] Date of Patent: Apr. 14, 1987

[54] HYDRAULICALLY DAMPED MOUNTING DEVICE

[75] Inventor: John P. West, Devizes, United Kingdom

[73] Assignee: Avon Industrial Polymers Limited, Wiltshire, United Kingdom

[21] Appl. No.: 840,972

[22] Filed: Mar. 13, 1986

Related U.S. Application Data

[63] Continuation of Ser. No. 572,580, Jan. 20, 1984, abandoned.

[30] Foreign Application Priority Data

May 12, 1983 [GB] United Kingdom ................ 8313111

[51] Int. Cl.⁴ ............................................. F16M 1/02
[52] U.S. Cl. ................................ 267/140.1; 267/8 R; 267/35
[58] Field of Search ................. 267/64.27, 140.1, 141, 267/141.1, 141.2, 141.3, 141.4, 141.5, 141.6, 141.7, 64.13, 64.19, 152, 35, 64.25, 64.11, 8 R; 188/278, 298, 378, 269, 379; 248/562, 563, 566, 634

[56] References Cited

U.S. PATENT DOCUMENTS

| 2,457,749 | 12/1948 | Thiry | 267/140.1 |
| 4,407,491 | 10/1983 | Kunihiro et al. | 267/63 R |

FOREIGN PATENT DOCUMENTS

| 0006819 | 1/1980 | European Pat. Off. . | |
| 0027751 | 4/1981 | European Pat. Off. | 267/140.1 |
| 0040290 | 11/1981 | European Pat. Off. | 267/140.1 |
| 0042910 | 1/1982 | European Pat. Off. . | |
| 0050446 | 4/1982 | European Pat. Off. . | |
| 0065431 | 11/1982 | European Pat. Off. . | |
| 0088682 | 9/1983 | European Pat. Off. . | |
| 0098331 | 1/1984 | European Pat. Off. . | |
| 0098330 | 1/1984 | European Pat. Off. . | |
| 0110195 | 6/1984 | European Pat. Off. . | |
| 0110197 | 6/1984 | European Pat. Off. . | |
| 1238784 | 4/1967 | Fed. Rep. of Germany . | |
| 2618333 | 11/1977 | Fed. Rep. of Germany . | |
| 2659844 | 11/1977 | Fed. Rep. of Germany . | |
| 3125464 | 1/1983 | Fed. Rep. of Germany . | |
| 3142673 | 5/1983 | Fed. Rep. of Germany . | |
| 3245653 | 6/1984 | Fed. Rep. of Germany . | |
| 2500555 | 8/1982 | France | 188/269 |
| 2508582 | 12/1982 | France . | |
| 56-94043 | 7/1981 | Japan . | |
| 0138422 | 8/1982 | Japan . | |
| 0161331 | 10/1982 | Japan | 248/562 |
| 0088240 | 5/1983 | Japan | 267/35 |
| 59-47541 | 3/1984 | Japan . | |
| 0811748 | 4/1959 | United Kingdom | 267/140.1 |
| 2041486 | 9/1980 | United Kingdom . | |
| 2041488 | 9/1980 | United Kingdom . | |
| 1581935 | 12/1980 | United Kingdom . | |
| 2068079 | 6/1981 | United Kingdom | 267/140.1 |
| 2104619 | 3/1983 | United Kingdom . | |
| 2108239 | 5/1983 | United Kingdom . | |
| 2132311 | 7/1984 | United Kingdom . | |

Primary Examiner—Duane A. Reger
Assistant Examiner—Alvin Oberley
Attorney, Agent, or Firm—Merchant, Gould, Smith, Edell, Welter & Schmidt

[57] ABSTRACT

A hydraulically damped mounting device has two anchor points joined by a resilient spring. The resilient spring and a partition define a working chamber for liquid, the working chamber being in communication with a compensation chamber via a passage. The compensation chamber is bounded by flexible bellows. A flexible diaphragm defines, together with the partition a gas pocket. Relative movement of the anchor points causes a change in pressure in the working chamber. High frequency vibrations are absorbed by movement of the diaphragm with little resistance to movement. Low frequency vibration cause liquid movement through the passage with a strong damping effect. This affect may be controlled by suitable selection of the length and diameter of the passage. Preferably, a bleed orifice extends from the gas pocket to compensate for thermal changes in the volume of the pocket.

11 Claims, 8 Drawing Figures

HYDRAULICALLY DAMPED MOUNTING DEVICE

This is a continuation of application Ser. No. 572,580, filed Jan. 20, 1984, now abandoned.

BACKGROUND OF THE INVENTION

1. Field of the Invention

The present invention relates to hydraulically damped mounting devices.

In a structure where it is desired to prevent the vibration of a piece of machinery (reciprocating engine for example) being transmitted to another part, it is common to provide an isolator (or mounting) between the two parts of the structure, the isolator being a combined spring and damper. The present invention is concerned with a mounting device where the damping is achieved at least partially hydraulically. It finds applications, for example, in mounting an engine in a vehicle. In general such mountings have to function under different types of vibrations, which may vary both in frequency and amplitude. In general, small amplitude vibrations have a high frequency and large amplitude vibrations have a low frequency, but this is not always the case due to e.g. resonances in the system. The resonances may arise both from the structure itself and from properties of the mounting device.

2. Description of the Prior Art

Conventional mountings usually have and all-elastomeric construction to provide a compromise between the requirement of high damping to control and limit large amplitudes at predominantly low frequency and the requirement at low damping to reduce the forces transmitted at small amplitude and high frequency. The present invention overcomes the need to compromise by providing two stage damping, i.e. to achieve a large degree of damping for high amplitude vibration but negligible damping at low amplitudes.

In UK No. 811748 a mounting was proposed which attempted to achieve this aim. It consisted of a first anchor point to be attached to one part of the structure, a second anchor point to be attached to another part of the structure, and a deformable wall in the form of a resilient spring element connecting together the fixing points. A surface of a flexible partition rigidly associated with the first anchor point defined, together with the spring element, a working chamber containing liquid. The working chamber communicated, via an aperture in the flexible partition with a compensation chamber or reservoir. The compensation chamber was bounded by a second deformable wall in the form of a bellows so that the volume of the compensation chamber was determined by the liquid pressure in it, which in turn was determined by the volume of the working chamber. Vibrations of one part of the structure relative to the other caused the anchor points to vibrate relative to each other and this caused flexing of the spring element thereby changing the volume of the working chamber. For small amplitude vibrations, flexing of the diaphragm absorbed the movement of hydraulic fluid caused by the change in the volume of the working chamber. For high amplitude oscillation, however, this movement was insufficient to take up all the volume change and hydraulic fluid moved between the working chamber and the compensation chamber through the aperture, the compensation chamber expanding or contracting by deformation of the second deformable wall to compensate for the movement of fluid. The fact that part of the second deformable wall was free to move is important to ensure that the compensation chamber acts as such. The volume of the compensation chamber must be variable in such a way as to respond to changes of pressure within the compensation chamber. Thus, the structure damped large oscillations but left small oscillations relatively undamped.

Numerous attempts have been made to improve the mounting of No. GB-A-811748. It is known from No. EP-A-0027751 and No. EP-A-0040290 to form the partition as a flexible membrane in a rigid support fixed to the first anchor point. Instead of an aperture in the flexible membrane, a long passage of small cross section but of significant volume is provided in the rigid support connecting the working and compensation chambers. The flexible membrane is to absorb low amplitude vibrations, namely those whose amplitude is not great enough to disturb the column of liquid in the long passage. Both European publications are concerned with detailed proposals for the construction or dimensions of the passage with a view to controlling the response of the assembly to high amplitude vibrations.

Neither of these publications, nor No. GB-A-2068079 (which also presents the idea of a differentiated response to high amplitude vibrations on the one hand and low amplitude vibrations on the other, but in a different type of mounting device) has any concept of a specifically frequency-responsive device.

SUMMARY OF THE INVENTION

The present invention seeks to provide a device which has the capacity for the isolation of high frequency as well as low frequency vibrations, independent of their amplitude. Furthermore it permits, at least in some embodiments, "tuning" of the response of the device to the expected behaviour of the vehicle or other structure into which it is to be incorporated.

It has been appreciated by the inventor of the present invention that the main factor controlling the low frequency response is the resistance to movement of liquid in the passage between the working chamber and the compensation chamber. No. EP-A-0027751 and No. EP-A-0040290 attempt to control the low frequency response by suitable design of the passage, but can never achieve isolation of this response because there must always be some transmission of vibration from the working chamber to the compensation chamber via the flexible membrane. To isolate the low frequency response it is necessary for the only pressure transmission between the chambers to be via the passage and this would entail a rigid partition. The low frequency response, by which is meant the response between about 5 and 20 Hz, may then be controlled by suitable selection of the parameters of the passage. However, the use of a rigid partition would eliminate the method used in the prior art for controlling the high frequency response.

The inventor of the present invention has realised that the high frequency response may be controlled if the pressure changes of the liquid in the working chamber were transmitted to a gas. Since the gas would respond more rapidly than the liquid to pressure changes, this would give a suitable high frequency response. Therefore the present invention proposes that a flexible diaphragm is provided in the working chamber, the diaphragm acting as a barrier between the liquid and a gas.

Within this general concept several different arrangements are possible for achieving the advantages of the present invention.

The first possible arrangement is for the diaphragm to define part of a closed gas pocket, which, is located on the partition. Relative movement of the anchor points causes a change in volume of the working chamber, which change is transmitted to the gas pocket. Since the pocket is closed, work must be expended in causing it to expand or contract and thus an air-spring is formed. This air spring controls the high frequency response of the mounting device.

A problem with such an arrangement, however, is that thermal expansion or contraction of the gas pocket will cause the diaphragm to be biased from its normal position, which would have a detrimental effect on the behaviour of the mounting device. Changes of temperature are likely to occur if the mounting device is used to mount the engine of a motor vehicle, and hence it is desirable to provide some means of temperature compensation. One arrangement in which this is achieved proposes providing a bleed orifice leading from the gas pocket to the ambient atmosphere. The effective aperture of the bleed orifice is sufficiently small for the gas pocket to act as a closed pocket under high frequency changes, but to permit thermal equalisation of the pressure inside the gas pocket. Changes in pressure due to thermal effects occur much more slowly than the vibrations which affect the mounting device when in normal use.

By suitable choice of the effective aperture of the bleed orifice, the characteristics of the mounting device may be "tuned" to give a desired frequency response. A development of this is to make the effective aperture adjustable in response to e.g. engine frequency, to provide a mounting device with a variable frequency response.

An alternative, or additional, way of compensating for pressure changes in the gas pocket is to make the volume of the gas pocket controllable.

Another arrangement in which thermal compensation is achieved provides a bleed orifice from the gas pocket which leads to a gas reservoir, the pressure in which is affected by the liquid pressure in the compensation chamber. Then, thermal expansion of the gas pocket causes a corresponding increase in pressure in the liquid in the compensation chamber, and hence in the liquid in the working chamber, thus equalising pressure across the diaphragm.

In the prior art constructions described previously, at least part of the deformable wall joining the two anchor points is a resilient spring. However, it is possible to achieve the advantages of the present invention in an arrangement in which the resilient spring forms the or a part of the deformable wall of the compensation chamber, and the other deformable wall is a flexible bellows. This arrangement has the advantage that the resistance to movement of the anchor points is determined primarily by the gas pocket and the movement of liquid through the passage linking the working and compensation chambers. This gives a particularly favourable high frequency response.

BRIEF DESCRIPTION OF THE DRAWINGS

Embodiments of the invention will now be described, by way of example, with reference to the accompanying drawings, in which.

DETAILED DESCRIPTION OF EMBODIMENTS OF THE INVENTION

Figure 1:
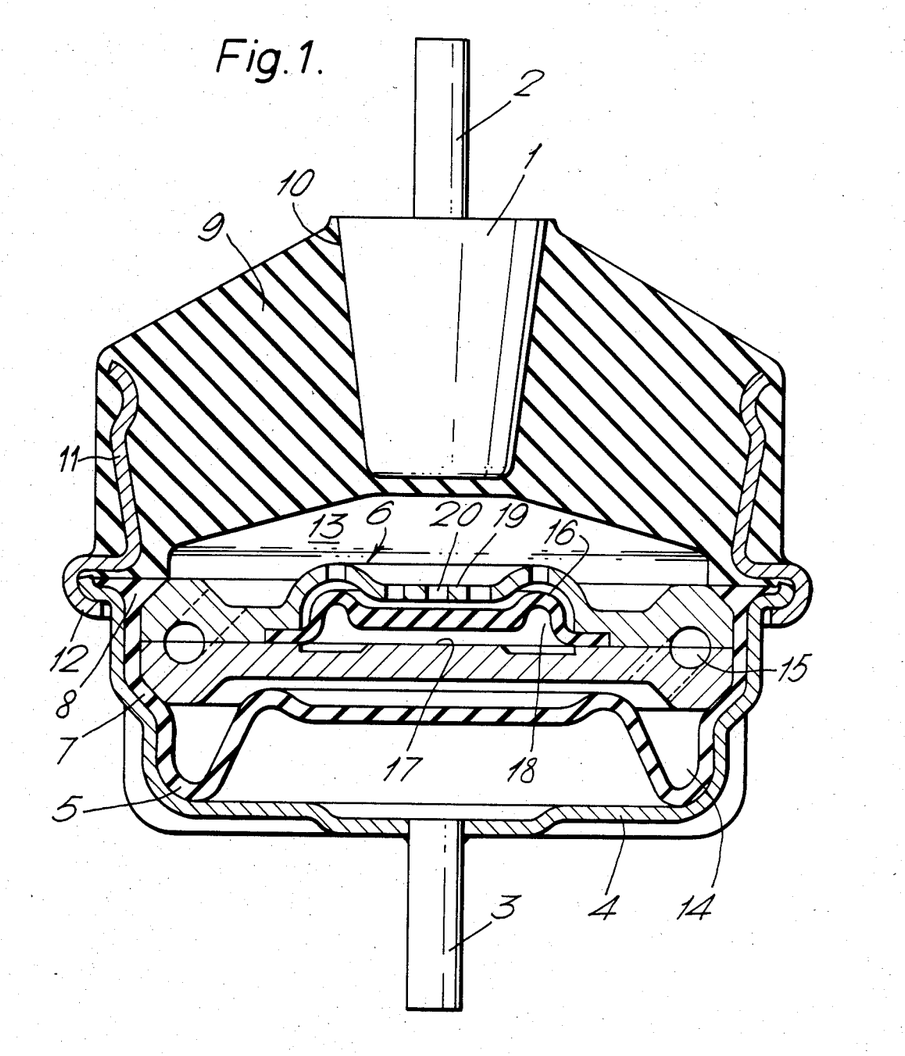
FIG. 1 shows a hydraulically damped mounting device being a first embodiment of the present invention.

Referring first to FIG. 1 a first embodiment of a mounting device according to the present invention has a boss 1 connected via a fixing bolt 2 to one of the parts of the structure. The other part of the structure is connected to a bolt 3 fixed on a generally U-shaped cup 4. Inside the cup 4 is a deformable wall formed by a flexible bellows 5 which receives adjacent the rim of the cup 4 a rigid partition 6. To hold this partition 6 in place the cup 4, and hence the bellows 5, have a step 7 which extends partially underneath the partition 6. The bellows 5 also has a splayed portion 8 adjacent the rim of the cup 4 which overlaps that rim and the partition 6. This splayed portion 8 abuts against an annular surface of a resilient spring 9 made of e.g. rubber which extends from that annular surface over the partition and which has a recess 10 which receives the boss 1. An annular bracket 11 extends into the resilient spring 9 and has a part 12 extending over the rim of the cup 4 thereby securing the resilient spring 9 to the cup 4. This also has the effect of forcing the resilient spring 9 against the splayed portion 8 of the bellows thereby pressing that splayed portion against the partition 6.

Thus, a working chamber 13 is formed between the resilient spring 9 and the partition 6, and a compensation chamber or reservoir 14 is formed between the partition and the bellows 5. The working chamber 13 and the reservoir 14 are filled with hydraulic fluid. The partition has a passage 15 extending through it communicating at one end with the working chamber 13 and at the other with the reservoir 14. As shown in the Figure the passage 15 is long and extends around the circumference of the partition 6.

A diaphragm 16 made of e.g. rubber like material extends over a portion of surface 17 of the partition 6 in the chamber 13 and has gas, such as air, in the space 18 between it and the surface 17 of the partition 6. A cover 19 having apertures 20 therein extends in the chamber 13 over the diaphragm 16. As shown in FIG. 1, the partition 6 is formed into two parts with the cover 19 being integral with the upper part.

Thus, when oscillations are transmitted from the structure to the boss 1 via the bolt 2, the boss 1 moves towards or away from the partition 6. The spring element flexes and reduces (increases) the volume of the working chamber. At high frequencies, the inertia of the liquid in the passage 15 prevents the vibration being transmitted to the reservoir 14 and the pressure increase (or decrease) in the working chamber is transmitted to the diaphragm 16 via the apertures 20. The diaphragm 16 is forced towards (away from) the surface 17 of the partition, compressing (expanding) the air or other gas in the pocket 18 formed between the diaphragm 16 and the surface 17.

The gas pressure in the pocket 18 and the resistance to movement of the diaphragm 16 itself acts as a gas spring being activated by the oscillations. Due to the compression (expansion) of the air, the damping effect is applied to the vibrations, which increases with increasing amplitude oscillations. There is a limit to this. To prevent damage to the diaphragm 16, it is important that it is constrained from vibrating with too great an amplitude, and this is achieved by the limiting effect of surface 17 and cover 20.

At low frequencies the liquid moves more freely through the passage 15 and the damping effect is controlled by the length and dimensions of the passage and by the viscosity of the liquid. By selection of these parameters, the device can be designed to suit the particular application envisaged.

Figure 2:
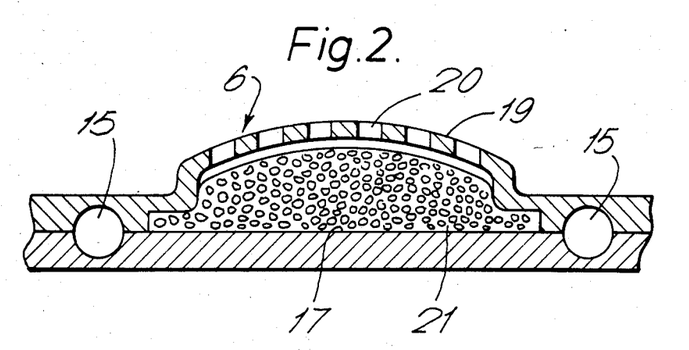
FIG. 2 shows an alternative diaphragm arrangement for use with the first embodiment.
Figure 3:
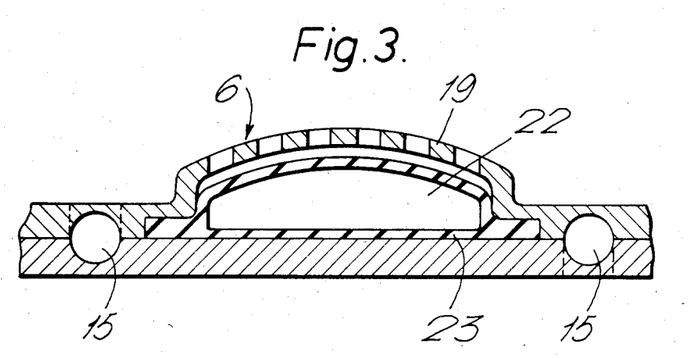
FIG. 3 shows another alternative diaphragm arrangement for use with the first embodiment.

FIGS. 2 and 3 show alternative configurations of the diaphragm. In FIG. 2 the gas pocket is formed by cells in a body 21 of closed cell foam rubber. Small amplitude oscillations are communicated to the body 21 through holes 20 in the cover 19 and expansion or contraction of the cells of the body absorb the vibrations. Large amplitude vibrations cause the body to be compressed against the surface 17 of the partition or to expand against the cover 19 so that the vibration causes fluid movement through the aperture 15 with a resulting high level of damping.

In FIG. 3 the gas pocket is formed by an encapsulated gas space 22 within a moulded capsule 23. The capsule 23 is held in the partition 6 and over-expansion is prevented by cover 19.

All these diaphragm arrangements give a closed gas pocket. However, a problem with such a pocket is that changes of the pressure in the pocket due to external effects such as heating of the device will cause a change in the characteristics of the mounting device. To overcome this problem it is necessary for the pressure of the gas in the pocket 18 to be adjustable and this may be achieved by providing a bleed orifice leading from the pocket 18.

Figure 4:
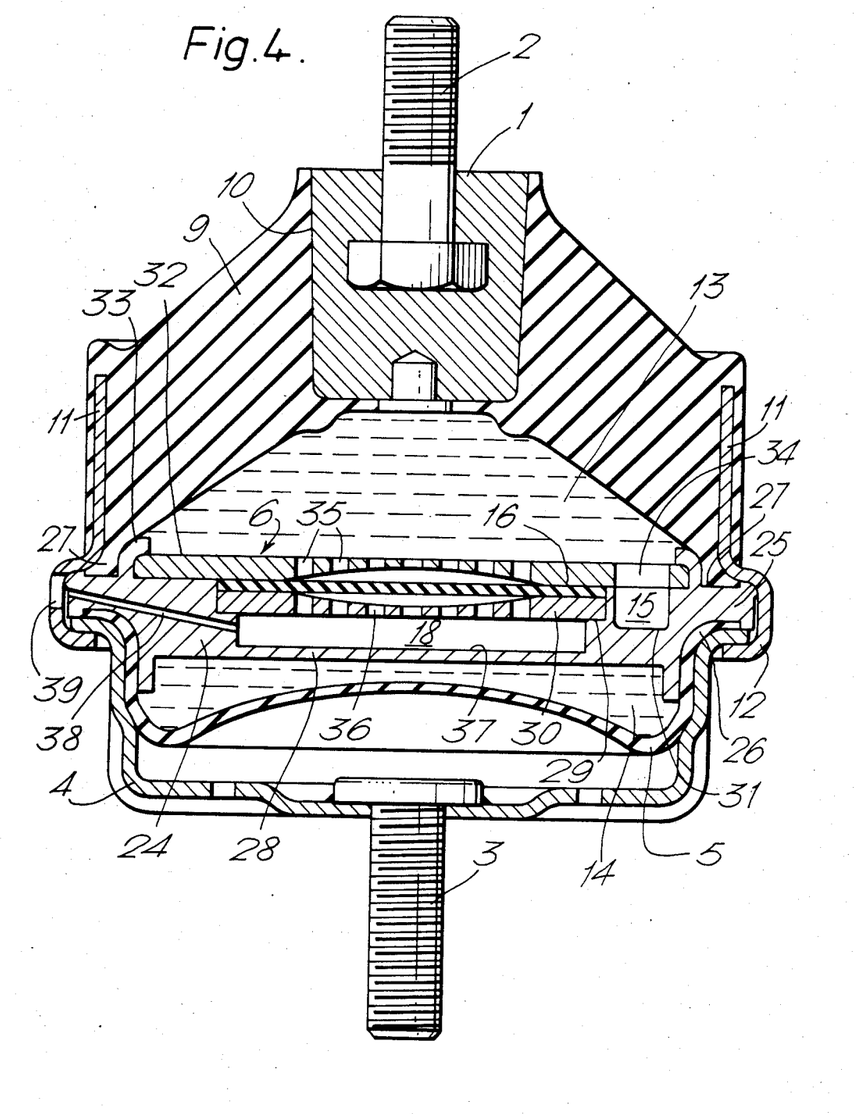
FIG. 4 shows a hydraulically damped mounting device being a second embodiment of the present invention.

A second embodiment of the present invention will now be described, with reference to FIG. 4, in which a bleed orifice leads from the pocket 18 to the ambient atmosphere. Parts of the mounting device similar to those of the first embodiment shown in FIG. 1 are indicated by the same reference numerals and will not be described further.

The partition 6 comprises a plate 24 which provides a rigid barrier between working chamber 13 and reservoir 14 and has a flange 25 at its outer periphery which is received between portions 26 and 27 of bellows 5 and resilient spring 9 respectively. The flange 25 and the splayed portions 26 and 27 are held together by part 12 of the annular bracket 11 which extends over the rim of cup 4.

The upper surface of the plate 24 has a central recess 28 formed in it which has a step 29 in its radially outer edge, which step 29 acts as a shoulder for receiving a lower perforated plate 30. The perforated plate 30 has a depression at its central portion and the diaphragm 16 rests on the thicker portions at the radially outer edge of the plate to be supported clear of the central part of the perforated plate 30. Thus a gas pocket 18 is formed bounded by the recess 28 and the diaphragm 16. A recess in the form of a part-annular channel 31 is formed in the plate 24 radially outwardly of the central recess 26. It is this part-annular channel 31 which forms the passage 15 between the chamber 13 and the reservoir 14.

An upper perforated plate 32 is secured on top of the lower plate 24, by lip 33, over the diaphragm 16. Part of the upper plate 32 extends over the channel 31 to form the top of the passage 15. An aperture 34 in the upper plate and a corresponding aperture (not shown) in the lower plate permit liquid to enter the passage 15. The lower surface of the upper plate 32 has a depression therein, and the peripheral portions of the upper plate 32 abut against the diaphragm 16 to clamp the diaphragm 16 between the lower plate 30 and the upper plate 32.

When high frequency vibrations are transmitted by the bolt 2 to the boss 1, the boss 1 moves towards (or away from) the partition 6 and the resilient spring 9 flexes and reduces (increases) the volume of the working chamber 13. This is similar to the operation of the embodiment of FIG. 1. The pressure of the hydraulic fluid in the working chamber 13 passes through holes 35 in the upper perforated plate 32 and forces the diaphragm 16 towards (or away from) the lower perforated plate 30. As the air between the diaphragm 16 and the lower perforated plate 30 is in communication with the air in the pocket 18 through holes 36, the movement of the diaphragm compresses (expands) the air in the pocket 18 and so there is little resistance to the oscillations. For larger amplitude oscillations, the diaphragm 16 is pressed against the lower perforated plate 30 (or the upper perforated plate 32) and continued movement of the boss 1 is possible only by movement of fluid from the chamber 13 to the reservoir 14 (or vice versa) through the aperture 15. At low frequencies, the main damping effect is given by the movement of the liquid through the passage 15.

The purpose of the lower perforated plate 30 is to limit the oscillations of the diaphragm 16 in the downward direction but permit the diaphragm 16 to influence the air in the pocket 18. In an alternative arrangement, a plurality of projections may be provided on the lower surface 37 of the recess 26 which extend sufficiently far from that surface to limit the movement of the diaphragm if the diaphragm contacts their upper surfaces. The pocket 18 is then formed by the space between such projections.

The mounting may be subject to significant fluctuations in ambient temperature, e.g. when used in a motor vehicle as an engine mounting there would be a significant temperature difference in the mounting when the engine has been running for a long time as compared to the temperature when the engine is not in use. Such temperature variations would cause expansion or contraction of the air in the space 18 and would bias the diaphragm 16 either towards the upper perforated plate 32 or towards the lower perforated plate 30. As explained previously, this biasing of the diaphragm 16 would affect the performance of the mounting as it would limit the possible movement of the diaphragm in one of its directions of movement. To overcome this problem a bleed orifice 38 is provided in the plate 24 extending from the recess 28, through the flange 25 and communicating with an opening 39 in the part of the bracket 11 which extends over the rim of the cup 4. This bleed orifice 38 is sufficiently narrow to prevent significant movement of air during vibrations of the diaphragm 16 but permits compensation for expansion or contraction of the air in pocket 18. The second embodiment is therefore preferred because it permits such compensation.

The dimensions of the bleed orifice 38 may be selected to give the desired characteristic to the gas spring formed by the pocket 18. However, in order for the bleed orifice 38 to restrict gas movement when vibrations are applied to the mounting device, it is necessary that the maximum effective aperture of the bleed orifice must be related to its length. It has been found that satisfactory results are achieved if the length of the bleed orifice 38 is at least five times its effective diameter.

Another parameter that is important in satisfactory operation of the mounting device is the ratio of the area of the diaphragm 16 to the effective area of the resilient spring 9, i.e. the area of a piston for which movement over a given distance would cause a pressure change in the working chamber 13 equivalent to the pressure change produced by a movement of the boss 1 over the same distance. If the area of the diaphragm 16 is less than the effective area of the resilient spring 9, a given movement of the boss 1 appears as a magnified movement of the diaphragm 16. This magnification effect is important because it is a factor in determining the amplitude of vibration at which the diaphragm 16 is forced against the lower or upper perforated plates 30 and 32, respectively. It has been found that the ratio of the area of the diaphragm 16 to the effective area of the resilient spring 9 is desirably about 1:5.

It has been discovered by the inventor of the present invention that at high frequencies a resonance develops in the working chamber. There is no transmission of pressure vibrations through the passage 15 and the interaction between the resilient spring 9 and the liquid in the working chamber 13 causes a resonance to develop. The working chamber 13 thus acts as a closed space. The resonance usually occurs between about 100 and 200 Hz, more particularly between 130 and 150 Hz and may be such as to negate the beneficial effects of the gas pocket 18. To overcome this it is possible to select an effective aperture for the bleed orifice which smooths out this resonance.

Figure 5:
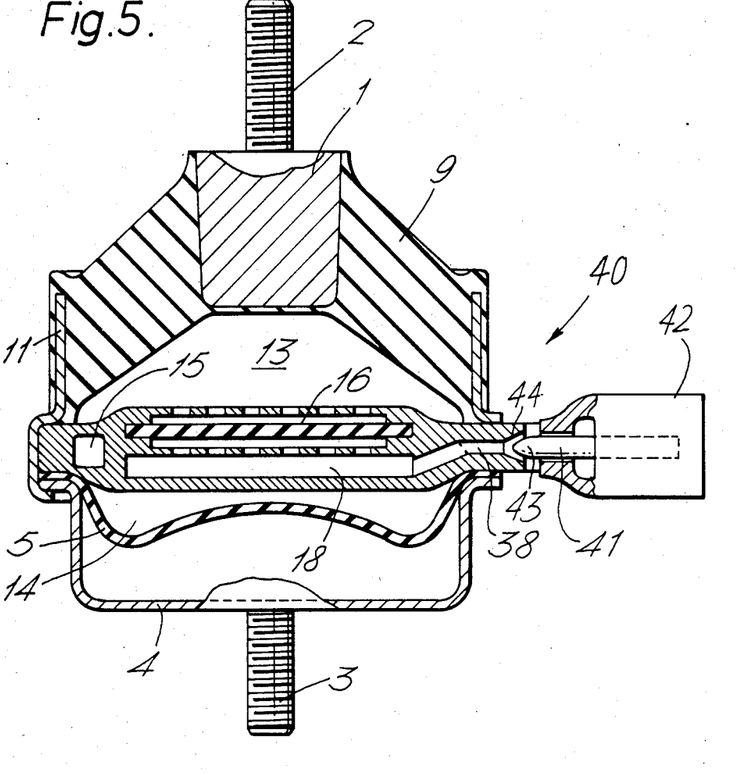
FIG. 5 shows a hydraulically damped mounting device being a third embodiment of the present invention.

However, in some cases it is desirable that the response may be changed in dependence upon frequencies of the vibrations in a way that would require different effective apertures of bleed orifice. To achieve this a third embodiment is proposed in which the effective aperture of the bleed orifice is controlled. Referring to FIG. 5, the bleed orifice 38 terminates in a valve 40. Apart from this, the third embodiment is generally similar to the second embodiment shown in FIG. 4 and corresponding parts are indicated by the same reference numerals.

The valve 40 comprises an obdurator element 41, the position of which is controlled by an actuator 42. The obdurator element 41 terminates in a tapered portion 43, the taper of which corresponds generally to the taper of the outlet 44 of the bleed orifice 38. The actuator 42 controls the position of the obdurator element 41 to control the gap between the tapered portion 43 and the outlet 44. Since it is this gap which determines the effective aperture of the bleed orifice 38, its diameter over the major part of its length is not as critical as is the second embodiment and in general will be of greater diameter.

The actuator 42 may be controlled by a frequency signal derived e.g. from the engine of a vehicle in which the device is mounted, thus enabling the frequency response of the device to be adjusted in response to the dominant frequency of the oscillations occurring between the anchor points of the device.

An alternative or additional way to control the high frequency response is to control the volume of the gas pocket. The fourth embodiment of the present invention, shown in FIG. 6, exemplifies one way of achieving volume control. The mounting device of the fourth embodiment is generally similar to the second embodiment, except that the gas pocket 18 is defined between the diaphragm 16 and a flexible membrane 45. There is a space 46 between the flexible membrane 45 and the inner surface 47 of the partition 6, and this space 46 is filled with a hydraulic fluid. In other respects the mounting device may be similar to the second embodiment shown in FIG. 4, and corresponding parts are indicated by the same reference numerals.

Figure 6:
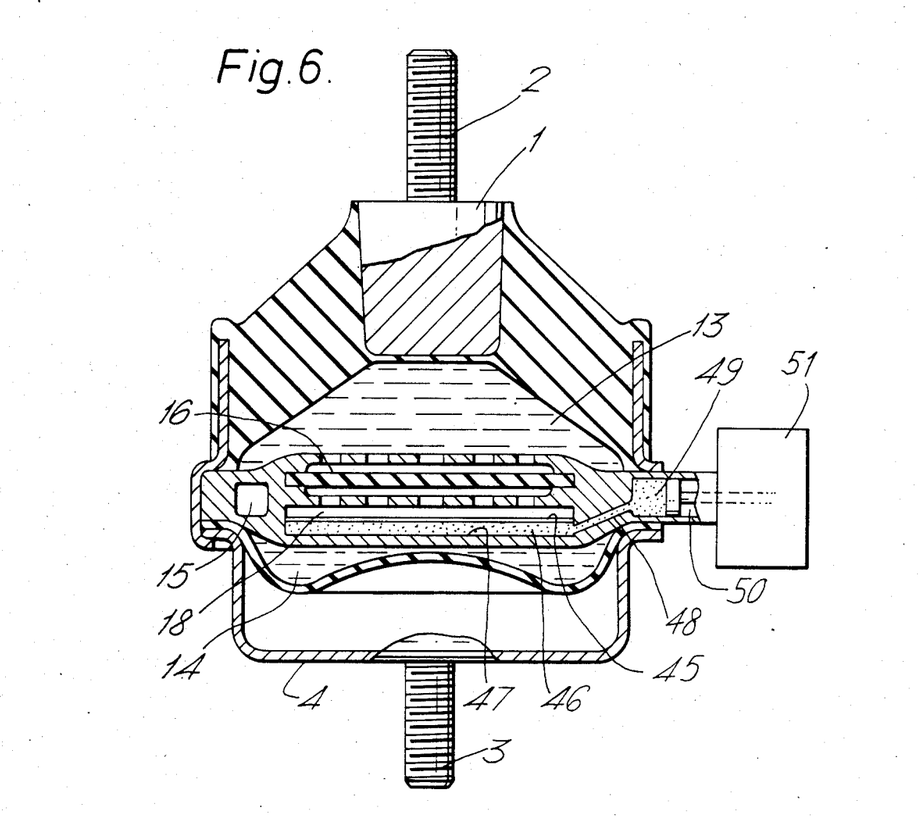
FIG. 6 shows a hydraulically damped mounting device being a fourth embodiment of the present invention.

A passageway 48 leads from the space 46 to a chamber 49 containing a piston 50. The position of the piston 50 in the chamber 49 is controlled by an actuator 51. Movement of the piston 50 is transmitted via the hydraulic fluid to the membrane 45 which flexes so as to increase or decrease the volume of the gas pocket 18. By changing the volume of the gas pocket 18, the spring effect of the gas varies, thereby varying the characteristics of the mounting device. The high frequency vibration is absorbed within the gas pocket 18 because the hydraulic fluid is relatively incompressible so that the membrane 45 acts as a rigid barrier to vibration of the gas in the pocket 18.

The gas pocket 18 may be closed, as in the first embodiment, but it is preferable that a bleed orifice be provided to permit compensation for temperature variations. It is even possible to provide a bleed orifice with a variable effective aperture, as in the third embodiment.

The control of the effective aperture of the bleed orifice in the third embodiment, or the control of the effective volume of the gas pocket in the fourth embodiment, enable the characteristics of the spring effect of the gas pocket to be "tuned" to smooth out high-frequency resonances. Indeed, it is possible to "tune" the response so that the total assembly has an uneven response with a decrease in stiffness at a frequency corresponding to the resonant frequency of the vehicle as a whole (usually due to the body of the vehicle).

Figure 7:
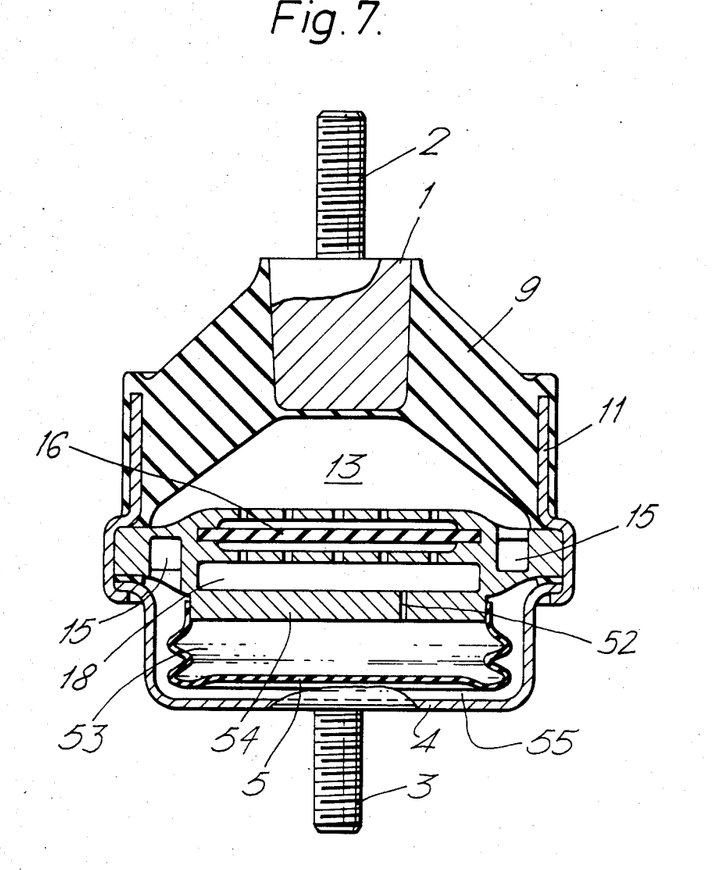
FIG. 7 shows a hydraulically damped mounting device being a fifth embodiment of the present invention.

The fifth embodiment of the present invention, shown in FIG. 7, illustrates another way to compensate for temperature change. A bleed orifice 52 leads from the gas pocket 18, but instead of leading to the ambient atmosphere as in the second embodiment, it leads to a gas reservoir chamber 53 on the other side of the partition 6. The gas reservoir chamber 53 is bounded by the surface 54 of the partition 6 opposite to the diaphragm 16 and by the bellows 5. The compensation chamber or reservoir 55 for the hydraulic fluid is then defined between the bellows 5 and the inner surface of the cup 4. Otherwise the fifth embodiment may be similar to the second embodiment and corresponding parts are indicated by the same reference numerals.

As the temperature of the device increases, the pressure of gas in both the pocket 18 and the chamber 53 increases, and gas communication through the bleed orifice 52 ensures that both are the same pressure. The increase in pressure is transmitted to the liquid in both the working chamber 13 and in the reservoir 55 and hence the pressure on either side of the diaphragm 16 is equalised, without deformation of the diaphragm 16.

The effective diameter of the bleed orifice 52 is sufficiently small to prevent significant gas movement when vibrations are applied to the mounting device, but permitting thermal equalisation (which is a relatively slow effect). As in the second embodiment, the effective aperture of the bleed orifice may be selected to give particular response characteristics to the device.

In all of the first five embodiments, the deformable wall connecting the two anchor points is a resilient spring. This is also true of the prior art constructions described previously. However, the inventor of the present invention has discovered that, because high frequency vibrations may be absorbed by a gas spring, an alternative construction is possible in which the anchor points are connected by a deformable, but inelastic element. There is then little resistance to relative movement of the anchor points except due to the gas spring and fluid damper effects of the mounting device.

The fact that there is little resistance to relative movement is important in the high frequency behaviour of the mounting device. In the first six embodiments, the high frequency response will be affected greatly by the response of the resilient spring. If, however, the connection of the two anchor points is flexible but inelastic, the high frequency response will be determined entirely by the movement of the diaphragm. At lower frequencies, the fluid moves through the passage in the partition giving a large damping effect.

To maintain pressure in the working chamber, and hence prevent the device collapsing under load, it is necessary that a resilient spring be provided as one wall of the compensation chamber.

It is desirable that the diaphragm and gas pocket are designed to have a pressure-displacement characteristic with a first region, corresponding to very small deflections, in which the deflection produced by a given change in pressure is small, a second region in which the deflection with a given change of pressure is large and a third region, corresponding to large deflections, in which again the deflection for a given change in pressure is small. The mounting device is then operated with a static deflection at approximately the mid-point of the second region. Thus, for small amplitude oscillations the partition will be deflected very easily so that small amplitude oscillations are absorbed within the mount, with little resistance. However, at large amplitude oscillations the deflection is sufficiently large to cause the diaphragm and gas pocket to operate in the first or third region of its characteristic and further changes in volume of the working chamber can only be achieved by a fluid movement of liquid to or from the reservoir. Thus, there is an increasing amount of damping.

Of course, the characteristic of the diaphragm and gas pocket may have a step-like characteristic with increasing pressure causing no deflection until a first pressure at which the characteristic changes to one of shallow slope where small changes in pressure cause a very large deflection until a predetermined deflection is reached, beyond which no deflection is possible. The range of possible deflections entirely within the slightly sloping region should be sufficient to absorb small amplitude vibrations (corresponding to the normal running vibrations of the engine when the mounting device is used as an engine mounting).

Figure 8:
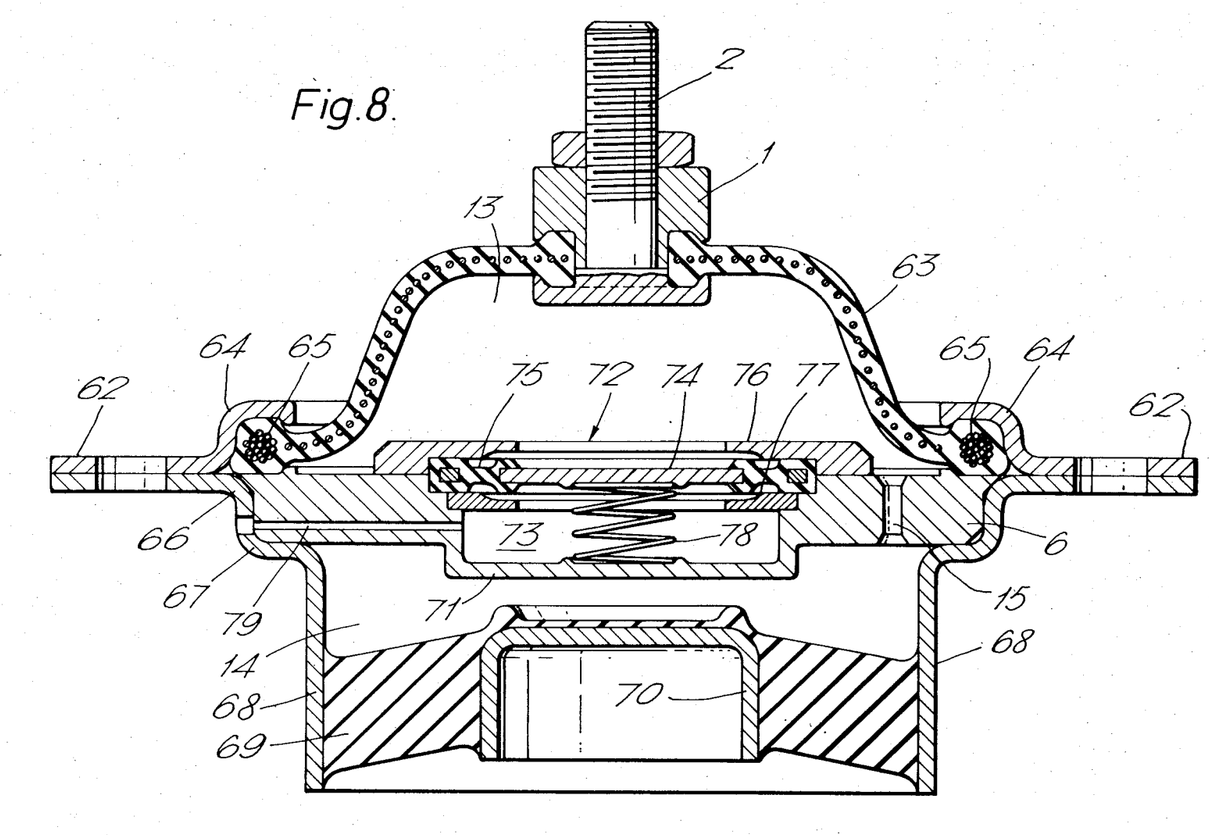
FIG. 8 shows a hydraulically damped mounting device being a sixth embodiment of the present invention.

A sixth embodiment of the present invention in which the anchor points are connected by an inelastic member will now be described with reference to FIG. 8. Parts similar to those of the previous embodiments will be indicated by the same reference numerals.

The hydraulically damped mounting device of the sixth embodiment has a boss 1 connected via a fixing bolt 2 to one of the parts of the structure (the fixing bolt 2 forming an anchor point), the other part of the structure being connected to an anchor point in the form of a support 62 at the side of the mounting device. The boss 1 is connected to the support 62 by a flexible inelastic member 63 made of, for example, reinforced rubber. The supports 62 have an upper part 64 which extends over a bead 65 of the inelastic member 63 and a lower part 66 with a step 67 on which rests a partition 6. The partition is held in place by the entrapment of its outer edge between the bead 65 and the step 67, with the bead 65 in turn held by the upper part 64 of the support 62. The partition, the inelastic member 63 and the boss 1 form the working chamber 13 of the mounting device. The lower part 66 of the support 62 has an annular wall 68 at the opposite side to the inelastic member 63 and this annular wall 68 is connected via a resilient spring 69 to a rigid cup 70. The partition 6, the annular wall 68, the resilient spring 69 and the cup 70 form a compensation chamber or reservoir 14. The cup 70 is not essential and the resilient spring 69 may extend completely across the annular wall 68. The working chamber 13 and the reservoir 14 control hydraulic fluid in the mounting device and are in fluid communication via a passage 15. Unlike the previous five embodiments the passage 15 may be a short direct passageway because damping is provided by the resistance to expansion of the reservoir 14 provided by the resilient spring 69. It is also possible to make the passage 15 long relative to its diameter by providing a part-annular duct extending around the partition 6 which communicates at one end with the work chamber 13 and at the other end with the reservoir 14.

The partition 6 has a depression 71 and a diaphragm 72 extends across the top of the depression 71 to define a gas pocket 73. As illustrated in FIG. 8, the diaphragm 72 consists of a rigid disc 74, the periphery of which is connected to the partition by a flexible annulus 75. Flanges 76 and 77 above and below the diaphragm 72 prevent excessive movement.

For vibrations less than a predetermined magnitude, high frequency vibrations are absorbed and damped by movement of the diaphragm 72. At higher amplitudes damping of the vibration is achieved by the resistance to expansion of the reservoir 14. Specifically low frequency damping may be provided by suitable design of the passage 15.

The annulus 75 may be resilient to resist movement of the disc 74 or optionally the annulus may be freely flexible and the disc 74 be biased to a central position between the flanges 76 and 77 by a helical spring 78. This gives a more linear characteristic over the effective travel of the disc 74. The gas pocket 73 may be closed or a bleed orifice 79 may be provided extending from The gas pocket 73 to ambient atmosphere. The effective aperture of the bleed orifice 79 may be controlled, as in the third embodiment.

Under static load the disc 74 is biased to a central point between the flanges 76,77. When small amplitude vibrations are applied to the boss 1 the inelastic member 63 offers virtually no resistance to movement and so the vibrations are transmitted directly to the liquid in the working chamber 13 causing a change in pressure within that chamber 13. The disc 74 is displaced from its central position, but as the slope of its pressure-displacement characteristic at the point is very small, the variations in pressure are absorbed by the displacement of the disc 74 and such absorption occurs quickly giving a good high frequency response. The vibration of the boss 1 is transmitted directly to the diaphragm 72 and the volume of the gas pocket 73 varies to compensate for the vibration. Therefore the boss 1 is effectively isolated from the rest of the mounting device and little or no damping force is transmitted to the boss 1. The mounting device behaves as if it were a spring with a very small stiffness.

If, however, the vibrations of the boss 1 increase in amplitude, the resilience of annulus 75 or spring 78 causes an increase in the resistance to movement of the disc 74 and force is transmitted from the diaphragm 72 to the fluid in the chamber 6 and hence to the boss 1; effectively the stiffness of the spring component of the mounting increases. At sufficiently high displacements, the diaphragm snubs out against the flanges 76 and 77 and any further changes in pressure within the working chamber 13 can only be compensated for by movement of fluid through the passage 15 into or from the reservoir 14. The viscosity of the fluid, the length of the passage 15 and the resistance provided by the resilient spring 69 all contribute to the formation of a large damping force. Thus at high amplitudes the damping effect predominates and the advantages of a conventional hydraulically damped mounting are realised.

Thus the present invention provides a hydraulically damped mounting device with an improved high frequency response. The mounting device may be considered as the parallel connection of a spring (formed by the gas pocket) and a damper (formed by the passage and the reservoir). The use of an elongate passage is equivalent to a mass on the damper. The "softness" of the spring is determined by the design of the gas pocket. In the sixth embodiment, the damper is disconnected at amplitudes less than a predetermined amount.

What is claimed is:

1. A hydraulically damped mounting device comprising:
    a first anchor point;
    a second anchor point;
    a first deformable wall connecting said first and said second anchor points;
    a rigid partition rigidly associated with said first anchor point;
    a working chamber enclosed between said first deformable wall and said partition, said working chamber containing a liquid;
    a second deformable wall;
    a compensation chamber for said liquid, said compenstion chamber being at least partially bounded by said second deformable wall, at least a part of said second deformable wall being freely movable in dependence upon changes of pressure of said liquid in said compensation chamber;
    a passage between said working chamber and said compensation chamber to allow fluid communication of said liquid between said working chamber and said compensation chamber;
    a flexible diaphragm in contact with said liquid in said working chamber, said flexible diaphragm acting as a barrier between said liquid in said working chamber and a gas chamber partially bounded by said rigid partition, said flexible diaphragm being mounted on said rigid partition;
    a first rigid abutment means rigidly associated with said rigid partition, said rigid abutment means being located in said working chamber adjacent said flexible diaphragm and having apertures therein for fluid communication therethrough, whereby said rigid abutment means limits movement of said flexible diaphragm in a direction causing increase in volume of said gas chamber; and
    a second rigid abutment means rigidly associated with said rigid partition, said rigid abutment means being located in said gas chamber adjacent said flexible diaphragm and having apertures therein for gas communication therethrough, whereby said second rigid abutment means limits movement of said flexible diaphragm in a direction causing decrease in volume of said gas chamber.

2. A hydraulically damped mounting device according to claim 1 wherein the volume of said gas chamber is variable independently of the pressure of said liquid in said working chamber.

3. A hydraulically damped mounting device according to claim 1, wherein said first deformable wall includes an elastomeric spring, and the second deformable wall includes a flexible bellows.

4. A hydraulically damped mounting device according to claim 1, wherein said first deformable wall includes a flexible bellows and said second deformable wall includes an elastomeric spring.

5. A hydraulically damped mounting device according to claim 1, wherein said gas chamber is a closed pocket.

6. A hydraulically damped mounting device according to claim 1, wherein said gas chamber has a bleed orifice.

7. A hydraulically damped mounting device according to claim 6, wherein said bleed orifice terminates in a valve, a frequency signal is applied to said valve and said valve is controllable in dependence on said frequency signal.

8. A hydraulically damped mounting device according to claim 6, wherein said bleed orifice leads to ambient atmosphere.

9. A hydraulically damped mounting device according to claim 8, wherein the effective aperture of said bleed orifice is adjustable.

10. A hydraulically damped mounting device according to claim 6, having a gas reservoir chamber affected by the pressure of said liquid in said compensation chamber, said bleed orifice connecting said gas chamber and said gas reservoir chamber.

11. A hydraulically damped mounting device comprising:
    a first anchor point;
    a second anchor point;
    a first deformable wall connecting said first and said second anchor points;
    a rigid partition rigidly associated with said first anchor point;
    a working chamber enclosed between said first deformable wall and said partition, said working chamber containing a liquid;
    a second deformable wall;

a compensation chamber for said liquid, said compensation chamber being at least partially bounded by said second deformable wall, at least a part of said second deformable wall being freely movable in dependence upon changes of pressure of said liquid in said compensation chamber;

a passage between said working chamber and said compensation chamber to allow fluid communication of said liquid between said working chamber and said compensation chamber;

a flexible diaphragm in direct contact with said liquid in said working chamber, said flexible diaphragm acting as a barrier between said liquid in said working chamber and a gas;

a pocket at least partially defined by said flexible diaphragm, said pocket enclosing said gas, and said pocket having a bleed orifice, and a gas reservoir chamber affected by the pressure of said liquid in said compensation chamber, said bleed orifice connecting said pocket and said gas reservoir chamber.

* * * * *